(12) United States Patent
Lefebvre et al.

(10) Patent No.: US 10,975,721 B2
(45) Date of Patent: Apr. 13, 2021

(54) COOLED CONTAINMENT CASE USING INTERNAL PLENUM

(71) Applicant: PRATT & WHITNEY CANADA CORP., Longueuil (CA)

(72) Inventors: Guy Lefebvre, St-Bruno-de-Montarville (CA); Remy Synnott, St-Jean-sur-Richelieu (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 478 days.

(21) Appl. No.: 15/372,873

(22) Filed: Dec. 8, 2016

(65) Prior Publication Data
US 2017/0198604 A1     Jul. 13, 2017

Related U.S. Application Data

(60) Provisional application No. 62/277,622, filed on Jan. 12, 2016.

(51) Int. Cl.
*F01D 25/12*     (2006.01)
*F01D 25/24*     (2006.01)
(Continued)

(52) U.S. Cl.
CPC ........... *F01D 25/12* (2013.01); *F01D 25/145* (2013.01); *F01D 25/24* (2013.01); *F01D 25/26* (2013.01);
(Continued)

(58) Field of Classification Search
CPC ........ F01D 25/12; F01D 25/14; F01D 25/145; F01D 25/24; F01D 25/243; F01D 25/246;
(Continued)

(56) References Cited

U.S. PATENT DOCUMENTS

| 3,377,803 A | 4/1968 | Prachar |
| 4,019,320 A | 4/1977 | Redinger, Jr. et al. |

(Continued)

FOREIGN PATENT DOCUMENTS

| CA | 2715228 A1 | 4/2011 |
| DE | 102010022932 A1 | 12/2011 |

(Continued)

OTHER PUBLICATIONS

EP Search Report dated May 5, 2017 in corresponding EP application No. 17151214.

*Primary Examiner* — Igor Kershteyn
*Assistant Examiner* — Elton K Wong
(74) *Attorney, Agent, or Firm* — Norton Rose Fulbright Canada LLP

(57) ABSTRACT

A case assembly for a turbine section has a structural outer case structurally connected to a gas generator upstream of the outer case and to an exhaust case downstream of the outer case. The assembly further comprises a containment ring mounted within the outer case and surrounding a plurality of axially spaced-apart turbine stages. An inner surface of the containment ring defines a plurality of shroud receiving portions. An annular plenum is defined between the outer case and the containment ring. The plenum has an inlet connected to a source of pressurized coolant. Outlets are circumferentially and axially distributed and defined through the containment ring. The outlets provides flow communication between the annular plenum and the plurality of axially spaced-apart turbine stages.

20 Claims, 4 Drawing Sheets

(51) Int. Cl.
*F01D 25/14* (2006.01)
*F02C 7/18* (2006.01)
*F01D 25/30* (2006.01)
*F01D 25/26* (2006.01)
*F01D 21/04* (2006.01)
*F01D 9/04* (2006.01)

(52) U.S. Cl.
CPC .............. *F01D 25/30* (2013.01); *F02C 7/18* (2013.01); *F01D 9/042* (2013.01); *F01D 21/045* (2013.01); *F01D 25/246* (2013.01); *F05D 2220/32* (2013.01); *F05D 2240/11* (2013.01); *F05D 2240/35* (2013.01); *Y02T 50/60* (2013.01)

(58) Field of Classification Search
CPC ........ F01D 25/26; F01D 25/30; F01D 11/122; F01D 11/14; F01D 9/04; F01D 9/042; F01D 21/045; F05D 2240/11
See application file for complete search history.

(56) References Cited

U.S. PATENT DOCUMENTS

| | | | |
|---|---|---|---|
| 4,321,007 A | 3/1982 | Dennison et al. | |
| 4,426,191 A * | 1/1984 | Brodell | F01D 25/246 415/189 |
| 4,657,482 A | 4/1987 | Neal | |
| 4,793,770 A * | 12/1988 | Schonewald | F01D 9/04 415/142 |
| 5,100,291 A | 3/1992 | Glover | |
| 5,142,859 A * | 9/1992 | Glezer | F01D 5/082 415/115 |
| 5,152,666 A * | 10/1992 | Stripinis | F01D 25/26 415/116 |
| 5,351,478 A | 10/1994 | Walker et al. | |
| 5,407,320 A | 4/1995 | Hutchinson | |
| 5,603,606 A | 2/1997 | Glezer et al. | |
| 5,605,438 A * | 2/1997 | Burdgick | F01D 25/145 415/182.1 |
| 5,961,278 A | 10/1999 | Dorais et al. | |
| 5,971,703 A | 10/1999 | Bouchard | |
| 6,050,079 A | 4/2000 | Durgin et al. | |
| 6,139,263 A * | 10/2000 | Klingels | F01D 25/246 415/173.5 |
| 6,179,557 B1 | 1/2001 | Dodd et al. | |
| 6,185,925 B1 | 2/2001 | Proctor et al. | |
| 6,227,800 B1 | 5/2001 | Spring et al. | |
| 6,322,320 B1 | 11/2001 | Pfeiffer et al. | |
| 6,625,989 B2 | 9/2003 | Boeck | |
| 6,641,363 B2 | 11/2003 | Barrett et al. | |
| 6,817,189 B2 | 11/2004 | Boeck | |
| 6,899,518 B2 | 5/2005 | Lucas et al. | |
| 6,902,371 B2 | 6/2005 | Anderson, Jr. et al. | |
| 7,048,496 B2 | 5/2006 | Proctor et al. | |
| 7,070,387 B2 | 7/2006 | Crozet et al. | |
| 7,229,247 B2 | 6/2007 | Durocher et al. | |
| 7,229,249 B2 | 6/2007 | Durocher et al. | |
| 7,231,767 B2 | 6/2007 | Whiting | |
| 7,249,929 B2 | 7/2007 | Cummings et al. | |
| 7,273,345 B2 | 9/2007 | Birrell et al. | |
| 7,278,828 B2 | 10/2007 | Steplewski et al. | |
| 7,329,084 B2 | 2/2008 | Dittmann et al. | |
| 7,347,661 B2 | 3/2008 | Phipps et al. | |
| 7,373,773 B2 | 5/2008 | Noda | |
| 7,604,453 B2 | 10/2009 | Lee et al. | |
| 7,682,130 B2 | 3/2010 | Jurjevic | |
| 7,722,315 B2 | 5/2010 | Lee et al. | |
| 7,740,444 B2 | 6/2010 | Lee et al. | |
| 7,766,610 B2 | 8/2010 | Busekros et al. | |
| 7,785,067 B2 | 8/2010 | Lee et al. | |
| 7,798,765 B2 | 9/2010 | Snyder et al. | |
| 7,798,767 B2 | 9/2010 | Kondo et al. | |
| 8,087,249 B2 | 1/2012 | Ottaviano et al. | |
| 8,092,146 B2 | 1/2012 | Legare et al. | |
| 8,371,127 B2 | 2/2013 | Durocher et al. | |
| 8,876,463 B2 | 11/2014 | Durocher et al. | |
| 8,979,489 B2 | 3/2015 | Taillant et al. | |
| 8,998,563 B2 | 4/2015 | Rioux | |
| 9,074,609 B2 | 7/2015 | Zhang | |
| 9,097,140 B2 | 8/2015 | Hussain | |
| 9,228,447 B2 | 1/2016 | McCaffrey | |
| 9,238,971 B2 | 1/2016 | Casavant et al. | |
| 9,279,341 B2 | 3/2016 | Durocher et al. | |
| 9,316,111 B2 | 4/2016 | Eleftheriou et al. | |
| 9,316,153 B2 | 4/2016 | Patat et al. | |
| 9,366,184 B2 | 6/2016 | Bunker et al. | |
| 9,394,828 B2 | 7/2016 | Eleftheriou et al. | |
| 9,422,823 B2 | 8/2016 | Scott | |
| 9,435,218 B2 | 9/2016 | Casavant et al. | |
| 9,435,259 B2 | 9/2016 | Suciu et al. | |
| 9,488,069 B2 | 11/2016 | Feldmann et al. | |
| 2004/0120803 A1 * | 6/2004 | Lucas | F01D 9/04 415/116 |
| 2011/0135456 A1 | 6/2011 | Takanashi | |
| 2012/0034074 A1 | 2/2012 | Haggmark | |
| 2013/0266416 A1 * | 10/2013 | Bergman | F01D 25/246 415/1 |
| 2014/0144155 A1 * | 5/2014 | Down | F01D 9/042 60/782 |
| 2014/0234073 A1 * | 8/2014 | Moreton | F02C 7/18 415/1 |
| 2014/0241854 A1 | 8/2014 | Gekht et al. | |
| 2016/0003086 A1 | 1/2016 | Day et al. | |
| 2016/0003151 A1 | 1/2016 | Morrill | |
| 2016/0177830 A1 | 6/2016 | Guardi et al. | |
| 2016/0186571 A1 | 6/2016 | Suciu et al. | |
| 2016/0245114 A1 | 8/2016 | Wang | |
| 2017/0138211 A1 * | 5/2017 | Fukui | F01D 11/24 |
| 2018/0347369 A1 * | 12/2018 | Sakaguchi | F01D 5/18 |

FOREIGN PATENT DOCUMENTS

| | | |
|---|---|---|
| EP | 0572402 A1 | 12/1993 |
| EP | 618349 A1 | 10/1994 |
| EP | 2546471 A2 | 1/2013 |
| EP | 2623714 A2 | 8/2013 |
| EP | 2978939 A1 | 2/2016 |
| GB | 2417762 A | 3/2006 |
| IN | 201505556 P1 | 1/2016 |
| JP | 10008994 A | 1/1998 |
| JP | 2008309059 A | 12/2008 |
| JP | 05101328 B2 | 12/2012 |
| JP | 05718337 B2 | 5/2015 |
| RU | 2498087 C1 | 11/2013 |
| RU | 2499892 C1 | 11/2013 |
| RU | 2499893 C1 | 11/2013 |
| WO | WO2011105132 A1 | 9/2011 |

* cited by examiner

COOLED CONTAINMENT CASE USING INTERNAL PLENUM

CROSS-REFERENCE TO RELATED APPLICATIONS

This application claims priority from U.S. provisional patent application No. 62/277,622 filed on Jan. 12, 2016, the entire contents of which are incorporated by reference herein.

TECHNICAL FIELD

The application relates generally to gas turbine engines and, more particularly, to a cooling arrangement for a containment case of a turbine section.

BACKGROUND OF THE ART

Typically, a plurality external pipes are used to individually bring coolant to each turbine stage of a gas turbine engine. Each turbine stage is generally fed by an appropriate number of circumferentially spaced apart external pipes. Such an arrangement of multiple external pipes around the engine housing not only increases part count but also increase the risk of cooling air leakage. Also, since the containment case surrounding the turbine blades is not cooled on the outside, the case must be made thicker to withstand the high temperatures to which the turbine sections are exposed during engine operation. This results in additional weight.

SUMMARY

In one aspect, there is provided a case assembly for a turbine section of a gas turbine engine, comprising: a structural outer case configured to be structurally connected to a gas generator case and to an exhaust case; a containment ring mounted within the structural outer case and configured to surround a plurality of axially spaced-apart turbine stages, an inner surface of the containment ring defining a plurality of shroud receiving portions; an annular plenum defined between the structural outer case and the containment ring, the annular plenum having an inlet connectable to a source of pressurized coolant; and outlets circumferentially and axially distributed and defined through the containment ring, the outlets providing flow communication between the annular plenum and the plurality of axially spaced-apart turbine stages.

In another aspect, there is provided a casing assembly of a gas turbine engine, comprising, in an upstream to downstream order relative to a gas flow direction, a gas generator case, a structural outer case, and an exhaust case, the structural outer case being structurally connected to the gas generator case and to the exhaust case, the exhaust case supporting a bearing that supports an engine shaft, the assembly further comprising a containment ring coaxially disposed within the outer case and surrounding a plurality of axially space-apart turbine stages, the outer case and the containment ring defining an annular plenum therebetween, the annular plenum having an inlet configured for receiving pressurized cooling air and outlets circumferentially and axially distributed on the containment ring, the outlets providing fluid flow communication between the axially spaced apart turbine stages and the annular plenum.

In yet another aspect, there is provided a method for reducing thermal induced stress on a case assembly surrounding a plurality of turbine stages of a gas turbine engine, comprising defining an annular plenum within the case assembly, the case assembly comprising an outer case structurally connected to a gas generator case and to an exhaust case, the annular plenum being defined between the outer case and a containment ring, allowing radial and axial thermal expansion of the containment ring relative to the outer case and to the plurality of turbine stages, fluidly connecting the plurality of turbine stages with a source of pressurized coolant circulating through the annular plenum.

DESCRIPTION OF THE DRAWINGS

Reference is now made to the accompanying figures in which.

DETAILED DESCRIPTION

Figure 1:
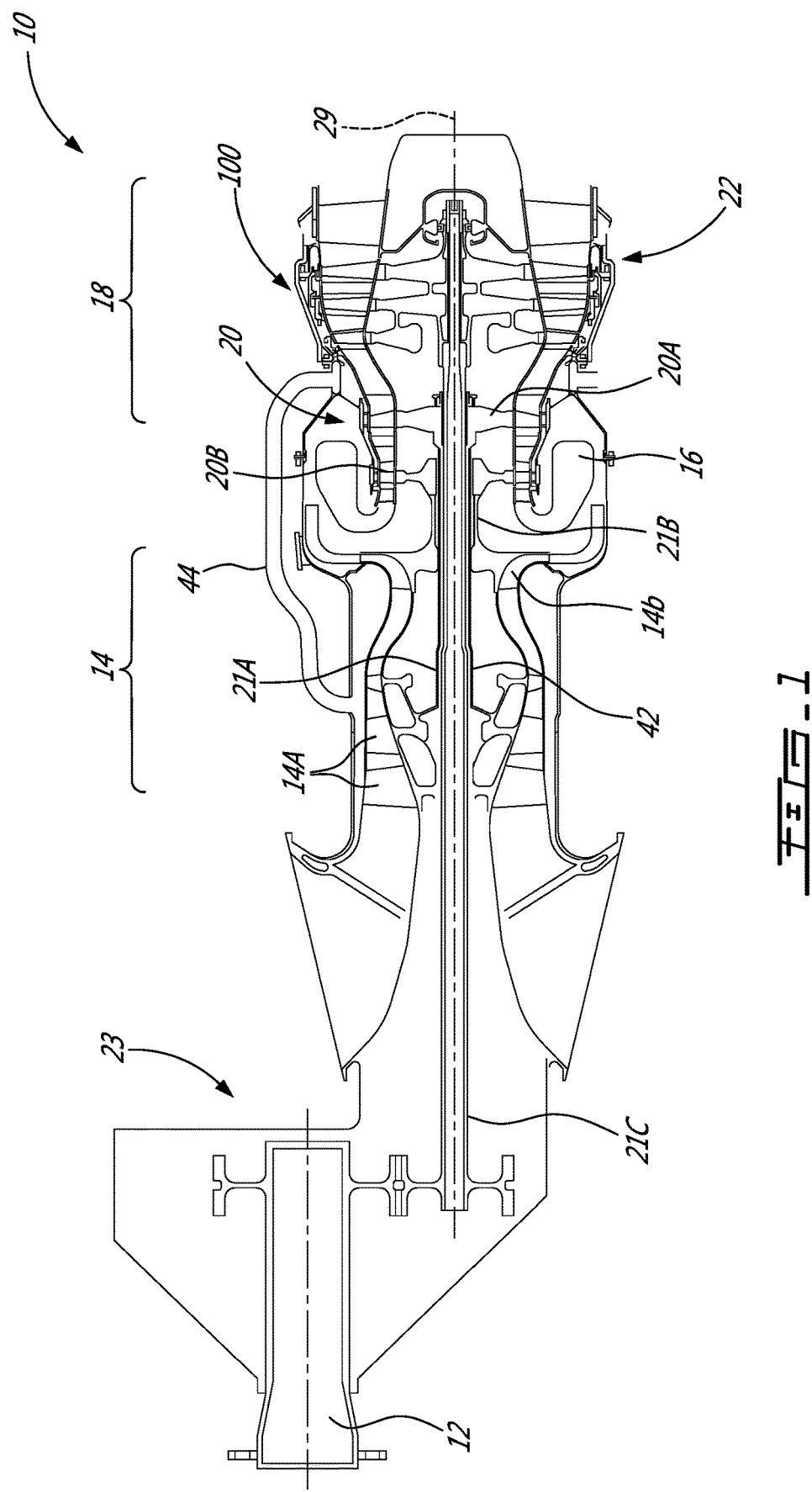
FIG. 1 is a cross-sectional view of a gas turbine engine having a turbine section including a cooled containment case using an internal plenum.

FIG. 1 illustrates a schematic view of gas turbine engine 10 of a turboshaft type suitable for driving rotatable loads, such as a main helicopter rotor. The engine 10 comprises an output shaft 12, a compressor section 14 for pressurizing the air, a combustor 16 in which the compressed air is mixed with fuel and ignited for generating an annular stream of hot combustion gases, and a turbine section 18 for extracting energy from the combustion gases.

Figure 2:
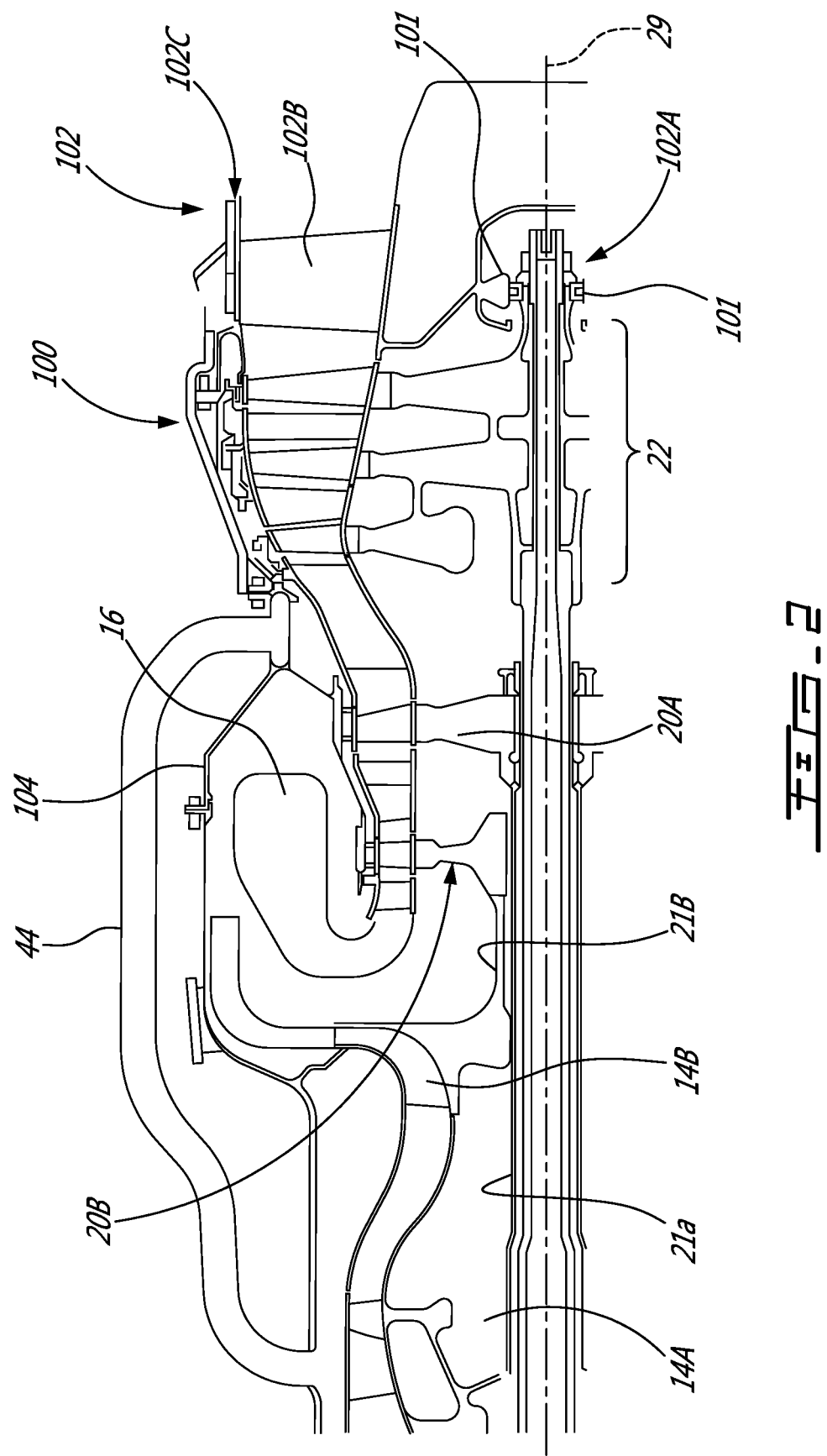
FIG. 2 is an enlarged cross-sectional view of a downstream portion of the gas turbine engine shown in FIG. 1 and illustrating the containment case mounted between a gas generator case and an exhaust case.

Referring to FIGS. 1 and 2, it can be appreciated that the compressor section 14 comprises a low pressure (LP) compressor 14a including a given number of stages (3 in the illustrated example) and a high pressure (HP) compressor 14b (an impeller in the illustrated example). The turbine section 18 comprises an HP turbine 20B, a compressor turbine 20A and a power turbine 22. In the exemplified embodiment, the power turbine 22 includes 3 stages.

The HP turbine 20B is drivingly connected to the HP compressor 14B via an HP shaft 21B. The HP turbine 20B, the HP compressor 14B and the HP shaft 21B form an HP spool rotatable about the engine axis 29.

The compressor turbine 20A is drivingly connected to the LP compressor 14A via a compressor drive shaft 21A. The LP compressor 14A, the compressor turbine 20A and the compressor drive shaft 21A forms a second spool rotatable about axis 29 independently of the HP spool.

The power turbine 22 is drivingly connected to a power turbine shaft 21C which is, in turn, drivingly connected to the output shaft 12 via a reduction gear box (RGB) 23 (FIG. 1). The power turbine shaft 40C extends concentrically within the compressor drive shaft 21B and the HP shaft 21B and is independently rotatable with respect thereto.

Figure 3:
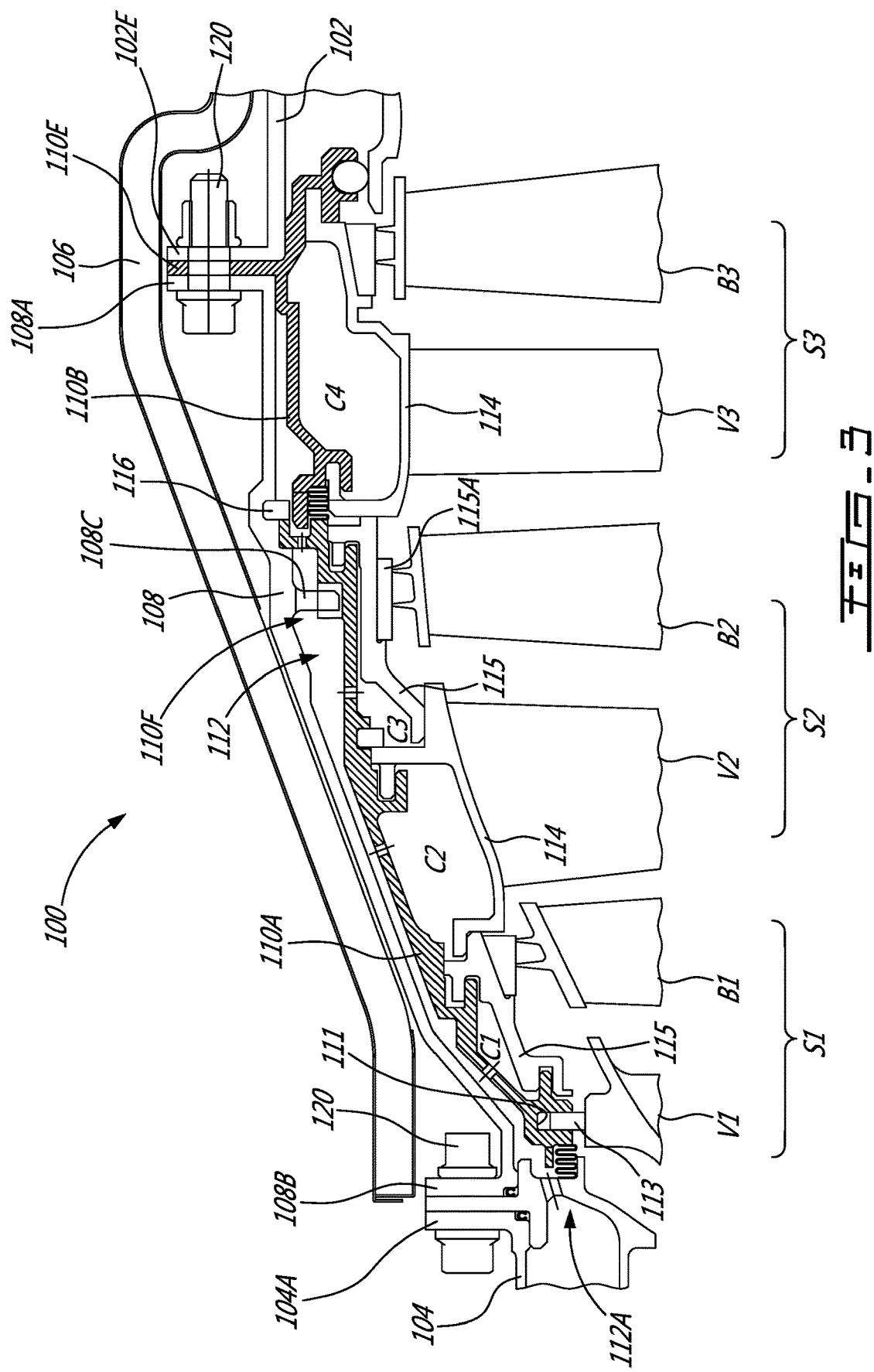
FIG. 3 is an enlarged cross-sectional view of a power turbine section of the downstream portion of the gas turbine engine shown in FIG. 1 and illustrating the cooling arrangement of the containment case.

As best shown in FIG. 3, each power turbine stage S1, S2, S3 comprises a stator and a rotor respectively including a set of circumferentially spaced-apart vanes V1, V2, V3 and a set of circumferentially spaced-apart blades B1, B2, B3. Understandably, the power turbine 22 may comprise more or less than three stages without departing from the scope of the present disclosure.

The power turbine stages S1, S2 and S3 are surrounded by a containment case 100 mounted between a gas generator case 104 and an exhaust case 102 projecting downstream from the containment case 100 relative to a flow of gasses through the engine. The containment case 100 comprises a structural outer case 108 having mounting flanges 108A and 108B at axially opposed ends thereof. The flange 108A at the downstream end of the structural outer case 108 is structurally connected to a corresponding mounting flange 102E of the exhaust case 102. The flange 108B at the upstream end of the structural outer case 108 is structurally connected to a corresponding flange 104A at the downstream end of the gas generator case 104. In one embodiment, the flanges 108A and 108B are respectively attached to corresponding flanges of the exhaust case 102 and the gas generator case 104 by means of bolts 120. Other suitable means may be used in place of the bolts. The outer case 108 forms a load path between the gas generator case 104 and the exhaust case 102. In operation, the outer case 108 supports axial and radial loads As shown in FIG. 2, the exhaust case 102 comprises an inner bearing support 102A structurally connected to an outer ring 102C by a plurality of radially extending structural struts 102b. The inner bearing support 102A supports a bearing 101 which, in turn, provides support to a downstream end of the power turbine shaft 21C. In operation, loads are transferred from the shaft 21C to the bearing support 102A and to the outer ring 102C through the struts 102. These loads are then transferred to the outer case 108 to which the outer ring 102c is mounted. The loads includes radial and axial loads. The outer case 108 must be able to withstand those loads. The structural outer case 108 is configured to be a load path for transferring loads between the gas generator case 104 and the exhaust case 102.

The containment case 100 further comprises a containment ring 110 coaxially mounted within the structural outer case 108. The containment ring 110 is configured to surround the plurality of axially spaced-apart turbine stages, S1, S2, and S3 of the power turbine 22. The containment ring 110 is adapted to contain failed blades or blade fragments so that in the unlikely event of a rotating part of the turbine becomes detached, it will be prevented from passing through the engine casing.

In one embodiment, the containment ring 110 comprises two sections, an upstream section 110A and an downstream section 110B for compact and low weight architecture. However, it is understood that the containment ring 110 could be of unitary construction.

Figure 4:
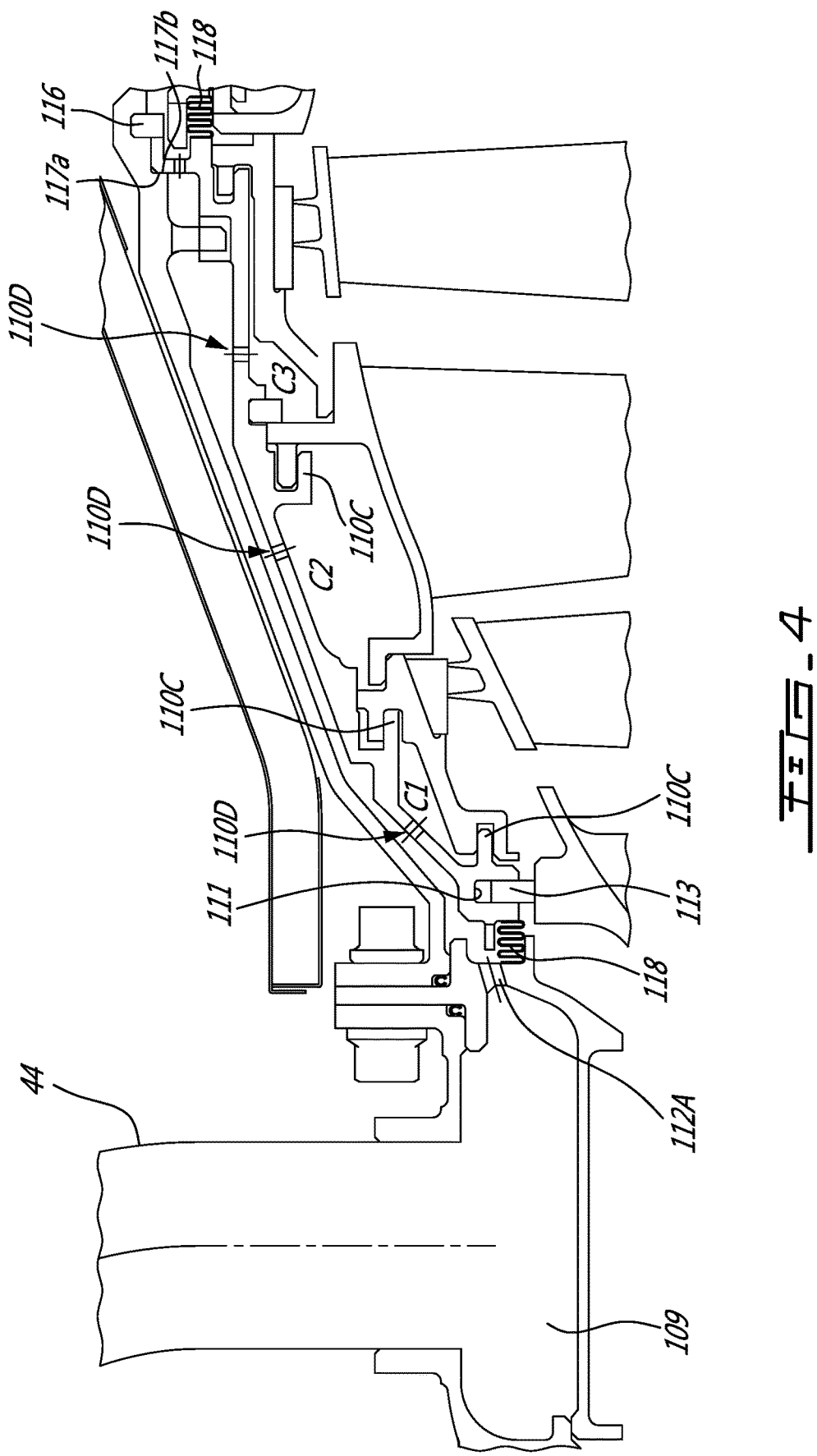
FIG. 4 is an enlarged view of an upstream portion of the cross-sectional view of FIG. 3.

Referring concurrently to FIGS. 3 and 4, a radially inner surface of the containment ring 110 defines a plurality of shroud receiving portions 110C. The shroud receiving portions 110C can, for instance, take the form of hooks for engagement with corresponding hooks projecting from the radially outer shroud 114 of the vanes V1, V2, and V3. The shroud receiving portions 110C may also be used to position blade shrouds 115 in relation to the tip of the power turbine blades B1, B2, B3. In one embodiment, the blade shrouds 115 comprises abradable surface 115A to minimize tip leakage of the blades B1, B2, and B3. The blade shrouds can be provided as an axial extension of the shroud of the upstream vane as exemplified in connection with the third power turbine stage S3 in FIG. 3.

The containment case 100 further defines an annular plenum 112 between the structural outer case 108 and the containment ring 110. The annular plenum 112 has an inlet 112A defined radially inwardly of flange 108B to receive air from a manifold 109 defined in the gas generator case 104 and connected to a pipe 44. In one embodiment, the coolant is provided from a plenum fed with compressed by the HP 14b. Alternatively, the compressed air could be taken from one of the stages of the low-pressure compressor 14A. The pressurized air is routed to the annular plenum 112 via pipe 44. The bleed air from the compressor is selected to be at a pressure higher than a pressure in the gaspath of the power turbine 22 to provide sealing all around the power turbine gaspath.

The containment ring 110 also defines outlets 110D, in the form of holes circumferentially and axially distributed and defined through the containment ring 110. The hole pattern is selected to obtain the desired flow distribution across the turbine stages S1, S2, S3 that is along a length of the containment ring. The outlets 110D provide flow communication between the annular plenum 112 and the plurality of axially spaced-apart turbine stages S1, S2, and S3. More specifically, the outlets 110D distribute air along a plurality of axially spaced-apart chambers C1, C2, C3, and C4 defined between the containment ring 110 and shrouds 114, which are configured for supporting the shrouded vanes V1, V2, and V3. In another embodiment, it may be possible to orient the outlets 110D as to provide impingement cooling toward certain critical portions of the shrouds 114, 115.

In one embodiment, a thermal blanket 106 may be provided around a circumferential outer surface of the structural outer case 108. The thermal blanket is used to ensure that the surface temperature around the power turbine section remains below the maximum outer casing temperatures allowed by airworthiness regulations.

In use, the compressor bleed air directed into the plenum 112 via inlet 112A cools down the containment ring 110 as it flows axially thereabout. A portion of the compressor bleed air is discharged from the plenum 112 at each turbine stage S1, S2, S3 according to a predetermined ratio defined by the holes 110D provided along the containment ring 110. The compressor bleed air is then used to cool down and pressurize the chambers C1, C2, C3, and C4 to avoid hot gas ingestion therein (i.e. to seal the chamber against gas path leakage).

In one embodiment shown in FIG. 4, axial withdrawal of the upstream section 110A of the containment ring 110 from the outer case 108 is blocked by a retaining ring 116 removably installed in a circumferential groove defined in the inner surface of the outer case 108. A referencing shoulder 117a on the part 110A is configured to axially abut against a corresponding referencing shoulder 117b to axially position the upstream section 110A relative to the outer case 108. Also, a dog and slot arrangement is provided between the containment ring 110 and the outer case 108 to circumferentially and axially position the containment ring relative to the outer case while allowing relative thermal growth to occur therebetween. The dog and slot arrangement may comprise lugs 108C projecting radially inwardly from the structural outer case 108 for engagement with slots 110F defined in the radially outer surface of upstream section 110A. The slots 110F and lugs 108C are circumferentially distributed. The upstream part 110A of the containment ring may be axially inserted from the downstream end inserted of the outer case 108 and rotated to lock the lugs 108C in the slots 110F in a bayonet like fashion. The upstream end of the upstream section 110A may also include a radially inwardly facing slot 111 for engagement with a lug 113 extending radially outwardly from vane V1, as shown in FIG. 4.

The downstream section 110B of the containment ring 110 may be bolted or otherwise suitably structurally connected to the outer case 108. In the illustrated embodiment, the downstream section 110B has a radially outwardly extending flange 110E sandwiched between the outer case flange 108A and flange 102E of exhaust case 102.

Spring-loaded sealing members 118 (e.g. W-shaped seal) are used between the upstream and downstream sections 110A, 110B of the containment ring 110 and between the containment ring 110 and the gas generator case 104. The sealing members 118 allows radial and axial thermal induced expansion of the containment ring 110 while limiting coolant leakage between the gas path and the plenum 112.

By so cooling the containment ring 110 and the outer case 108 with an annulus of pressurized cooling air therebetween, they can be made thinner which may result in significant weight savings. Also, it contributes to improve blade tip clearance, since the containment ring 110 is less subject to thermal growth. Furthermore, when the containment ring 110 is used to support and radially locate the vane V1, V2, V3 and shrouds 114 and 115, it improves the gas path as again the containment ring 110 and, thus, the shrouds 114 and 115 are less subject to thermal growth. It also results in less part in that there is no longer a need for different set of external pipes to bring cooling air to each turbine stages. The air is more uniformly distributed by the plenum 112 along the full axial length of the containment ring 108.

A method for reducing thermal induced stress on a case assembly 100 surrounding a plurality of turbine stages S1, S2, S3 of a gas turbine engine 10 is also disclosed. The method comprises: defining an annular plenum 112 within the case assembly 100. The case assembly 100 comprises an outer case 108 structurally connected to a gas generator case 104 and to an exhaust case 102. The annular plenum 112 is defined between the outer case 108 and a containment ring 110 surrounding the turbine stages.

The method further comprises allowing radial and axial thermal expansion of the containment ring 110 relative to the outer case 108 and relative to the plurality of turbine stages S1, S2, S3. This may be carried using lugs 108C inwardly protruding from the structural outer case 108 and configured to engage slots 110F defined in the containment ring 110. Retaining members, such as circlips 116 may also be used to axially retain the containment ring 110 within the outer case 108.

Also, the method comprises fluidly connecting the plurality of turbine stages S1, S2, S3 with a source of pressurized coolant circulating through the annular plenum 112. In one embodiment, the coolant is pressurized air extracted from the low-pressure compressor 14A. The method may thus further comprise bleeding compressor air and routing the bleeded air through a pipe 44.

The above description is meant to be exemplary only, and one skilled in the art will recognize that changes may be made to the embodiments described without departing from the scope of the invention disclosed. Still other modifications which fall within the scope of the present invention will be apparent to those skilled in the art, in light of a review of this disclosure, and such modifications are intended to fall within the appended claims.

The invention claimed is:

1. A case assembly for a turbine section of a gas turbine engine, comprising:
   a structural outer case configured to be structurally connected to a gas generator case and to an exhaust case;
   a containment ring mounted within the structural outer case and configured to surround axially spaced-apart turbine stages, the axially spaced-apart turbine stages having each a rotor and a stator, an inner surface of the containment ring defining a plurality of shroud receiving portions;
   an annular plenum defined between the structural outer case and the containment ring, the annular plenum extending radially from the containment ring to the structural outer case, the annular plenum having an inlet connectable to a source of pressurized coolant, the annular plenum extending axially from a first location upstream of both of the stators and the rotors of two of the axially spaced-apart turbine stages of the turbine section to a second location downstream of the two of the axially spaced-apart turbine stages to allow the pressurized coolant to flow from one turbine stage to a next turbine stage over an outer surface of the containment ring; and
   outlets circumferentially and axially distributed and defined through the containment ring, the outlets providing flow communication between the annular plenum and the axially spaced-apart turbine stages.

2. The case assembly of claim 1, wherein the containment ring comprises an upstream section and a downstream section, the upstream and downstream section being separately mounted to the structural outer case.

3. The case assembly of claim 2, wherein the upstream section and the downstream section define an axial gap therebetween.

4. The case assembly of claim 3, wherein a seal is disposed within the axial gap.

5. The case assembly of claim 1, wherein the pressurized coolant is air extracted from a low-pressure compressor.

6. The case assembly of claim 1, wherein the outer surface of the containment ring defines circumferentially separated slots engaged by circumferentially separated lugs inwardly protruding from the structural outer case.

7. The case assembly of claim 1, further comprising a thermal blanket circumferentially disposed around the structural outer case.

8. The case assembly of claim 1, wherein the inlet is located upstream of the outlets relative to a gas flow direction of a flow flowing within a gaspath of the gas turbine engine.

9. A case assembly of a gas turbine engine, comprising, in an upstream to downstream order relative to a gas flow direction, a gas generator case, a structural outer case, and an exhaust case, the structural outer case being structurally connected to the gas generator case and to the exhaust case, the exhaust case supporting a bearing that supports an engine shaft, the case assembly further comprising a containment ring coaxially disposed within the structural outer case and surrounding axially spaced-apart turbine stages, the axially spaced-apart turbine stages having each a rotor and a stator, the structural outer case and the containment ring defining an annular plenum therebetween, the annular plenum extending radially from the containment ring to the structural outer case, the annular plenum having an inlet configured for receiving pressurized cooling air and outlets circumferentially and axially distributed on the containment ring, the annular plenum extending axially from a first location upstream of both of the stators and the rotors of two of the axially spaced-apart turbine stages of the turbine section to a second location downstream of the two of the axially spaced-apart turbine stages, the outlets providing fluid flow communication between the axially spaced apart turbine stages and the annular plenum.

10. The case assembly of claim 9, wherein the containment ring comprises an upstream section and an downstream section defining an axial gap therebetween, and wherein a seal is disposed within the axial gap.

11. The case assembly of claim 9, wherein the pressurized coolant is air extracted from a compressor section of the gas turbine engine.

12. The case assembly of claim 9, wherein the outer surface of the containment ring defines circumferentially separated slots engaged by circumferentially separated lugs inwardly protruding from the structural outer case.

13. The case assembly of claim 9, further comprising a thermal blanket circumferentially disposed around the structural outer case.

14. The case assembly of claim 9, wherein the inlet is located upstream of the outlets relative to the gas flow direction.

15. A method for reducing thermal induced stress on a case assembly surrounding turbine stages of a gas turbine engine, the turbine stages having each a rotor and a stator, comprising:
defining an annular plenum within the case assembly, the annular plenum extending from a first location upstream of both of stators and rotors of two of the axially spaced-apart turbine stages of the turbine section to a second location downstream of the two of the axially spaced-apart turbine stages, the case assembly comprising an outer case structurally connected to a gas generator case and to an exhaust case, the annular plenum being defined between the outer case and a containment ring, the annular plenum extending radially from the containment ring to the outer case;
allowing radial and axial thermal expansion of the containment ring relative to the outer case and to the turbine stages; and
fluidly connecting the turbine stages with a source of pressurized coolant circulating through the annular plenum via outlets of the annular plenum, the outlets circumferentially and axially distributed on the containment ring.

16. The method of claim 15, wherein the source of pressurized coolant is a low-pressure compressor of the gas turbine engine, the method further comprising the step of bleeding the low-pressure compressor.

17. The method of claim 15, further comprising surrounding the outer case with a thermal blanket.

18. The method of claim 15, further comprising disposing a flexible sealing member between an aft section and a fore section of the containment ring.

19. The method of claim 15, further comprising sealingly engaging an upstream end of the containment ring with the gas generator case using a flexible sealing member.

20. The method of claim 15, wherein an inlet of the annular plenum is located upstream of the first location and wherein the outlets are located downstream of the first location.

* * * * *